United States Patent [19]

Reuter et al.

[11] Patent Number: 4,753,400
[45] Date of Patent: Jun. 28, 1988

[54] SHIPBOARD AIR VEHICLE RETRIEVAL APPARATUS

[75] Inventors: James D. Reuter, Manchester, Conn.; Alan H. Greenstadt, New York, N.Y.

[73] Assignee: Pioneer Systems, Incorporated, New York, N.Y.

[21] Appl. No.: 14,314

[22] Filed: Feb. 13, 1987

[51] Int. Cl.$^4$ ............................................... B64F 1/02
[52] U.S. Cl. ................................. 244/110 R; 244/116
[58] Field of Search ........... 244/110 R, 110 C, 110 E, 244/110 F, 110 G, 114 R, 115, 116, 63, 137 R, 152; 258/1.2, 1.4; 114/261

[56] References Cited

U.S. PATENT DOCUMENTS

| | | |
|---|---|---|
| 1,128,072 | 2/1915 | Steinmetz . |
| 1,164,967 | 12/1915 | Thorp ............................. 244/110 R |
| 1,712,164 | 5/1929 | Peppin ................................. 89/1.11 |
| 1,731,091 | 10/1929 | Belleville ......................... 244/110 F |
| 2,285,789 | 6/1942 | Woolley ............................... 89/1.11 |
| 2,365,778 | 12/1944 | Schwab ................................ 89/1.11 |
| 2,378,563 | 6/1945 | Lakatos, Jr. ............................ 89/36 |
| 3,389,880 | 6/1968 | Ferguson ......................... 244/137 R |
| 3,980,259 | 9/1976 | Greenhalgh et al. ................ 244/139 |
| 4,147,317 | 4/1979 | Mayhew et al. .................... 244/116 |
| 4,311,290 | 1/1982 | Koper ............................. 244/110 R |

FOREIGN PATENT DOCUMENTS 578440  6/1946  United Kingdom ............ 244/110 R

Primary Examiner—Sherman D. Basinger
Assistant Examiner—Rodney Corl
Attorney, Agent, or Firm—Sperry, Zoda & Kane

[57] ABSTRACT

A shipboard mounted apparatus for the retrieval of air vehicles, including remotely piloted, or automonous, unmanned vehicles, which includes a deployable lifting device such as a ram-air parachute which is secured through a tow line to the ship traveling upwind therebelow. A capturing device such as a ribbon parachute which may be annular is also movably secured to the tow line immediately below the ram-air parachute and may include a homing beacon therein such that capture of an air vehicle is achieved by it traveling into and collapsing this ribbon parachute. A winch is secured to the ship therebelow and is attached to the lower end of the tow line to control the inward and outward movement of the extended tow line. Once an air vehicle is captured in the ribbon parachute, the tow line is pulled in by the winch allowing the collapsed ribbon parachute and the captured air vehicle to be drawn into the ship to thereby be received by a landing net preferably of an open mesh nylon webbing. An initial launching device can be included such as an additional parachute or an explosive mortar device to provide the initial air-borne impetus to the ram-air parachute and ribbon capturing parachute.

56 Claims, 6 Drawing Sheets

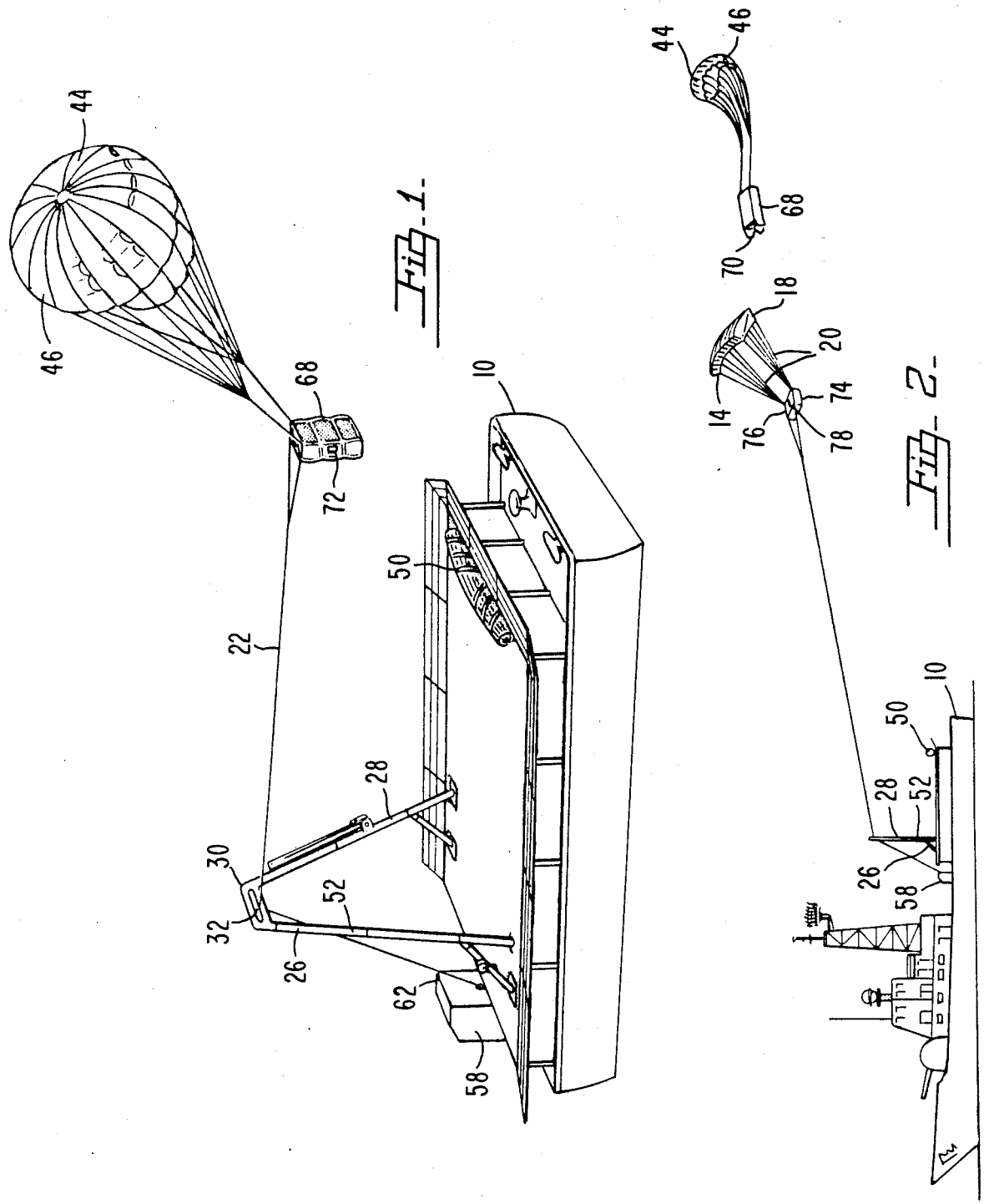

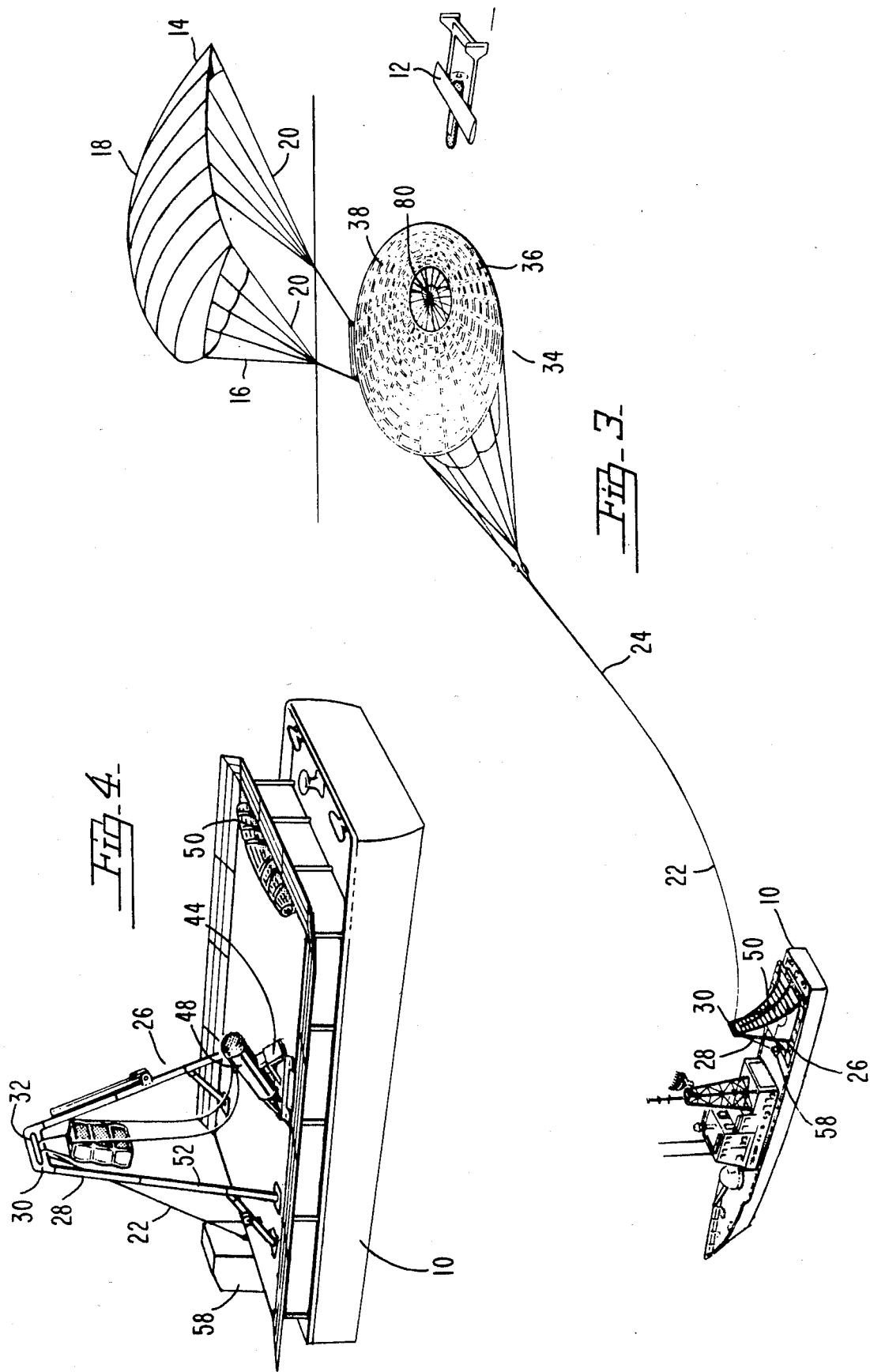

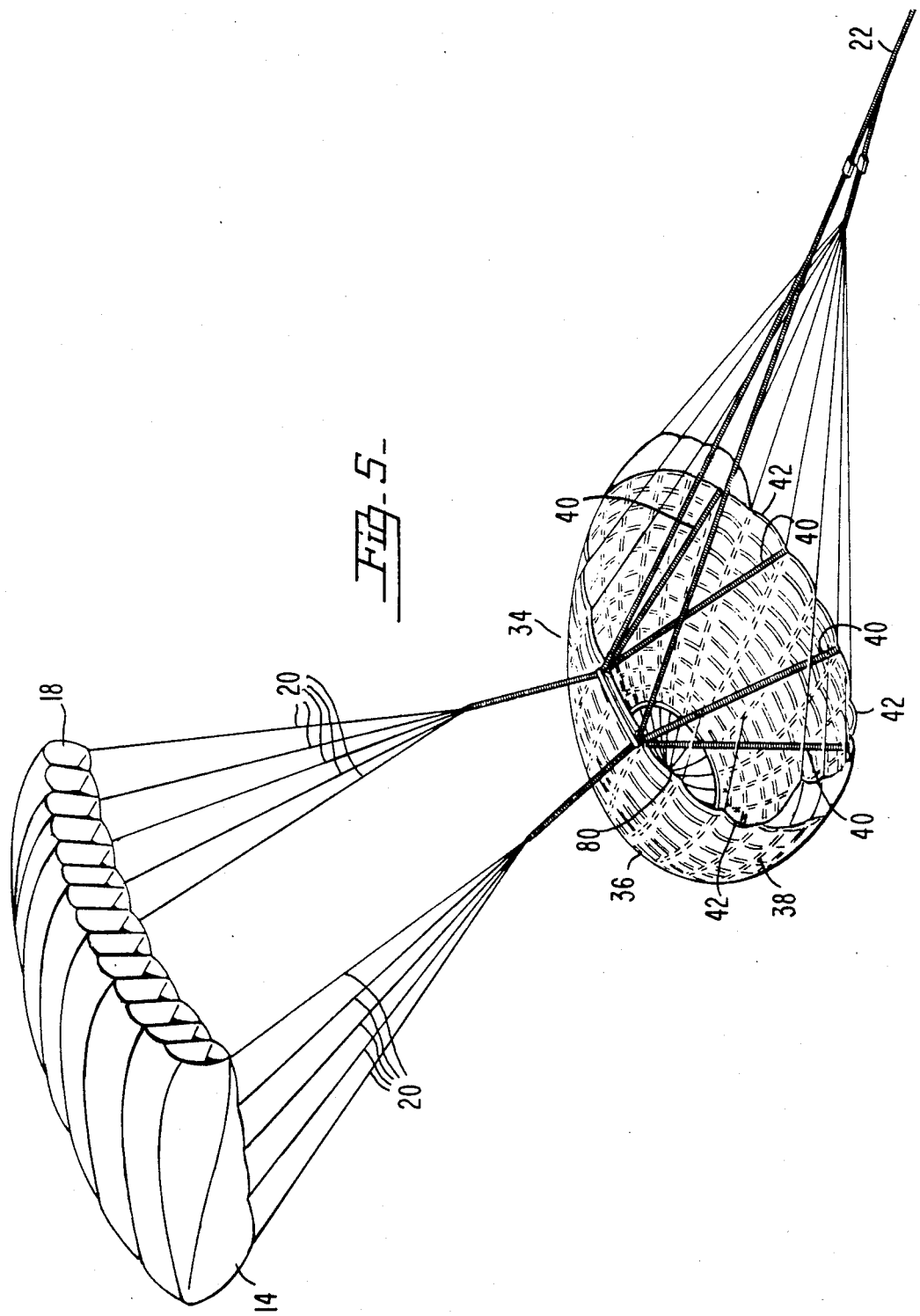

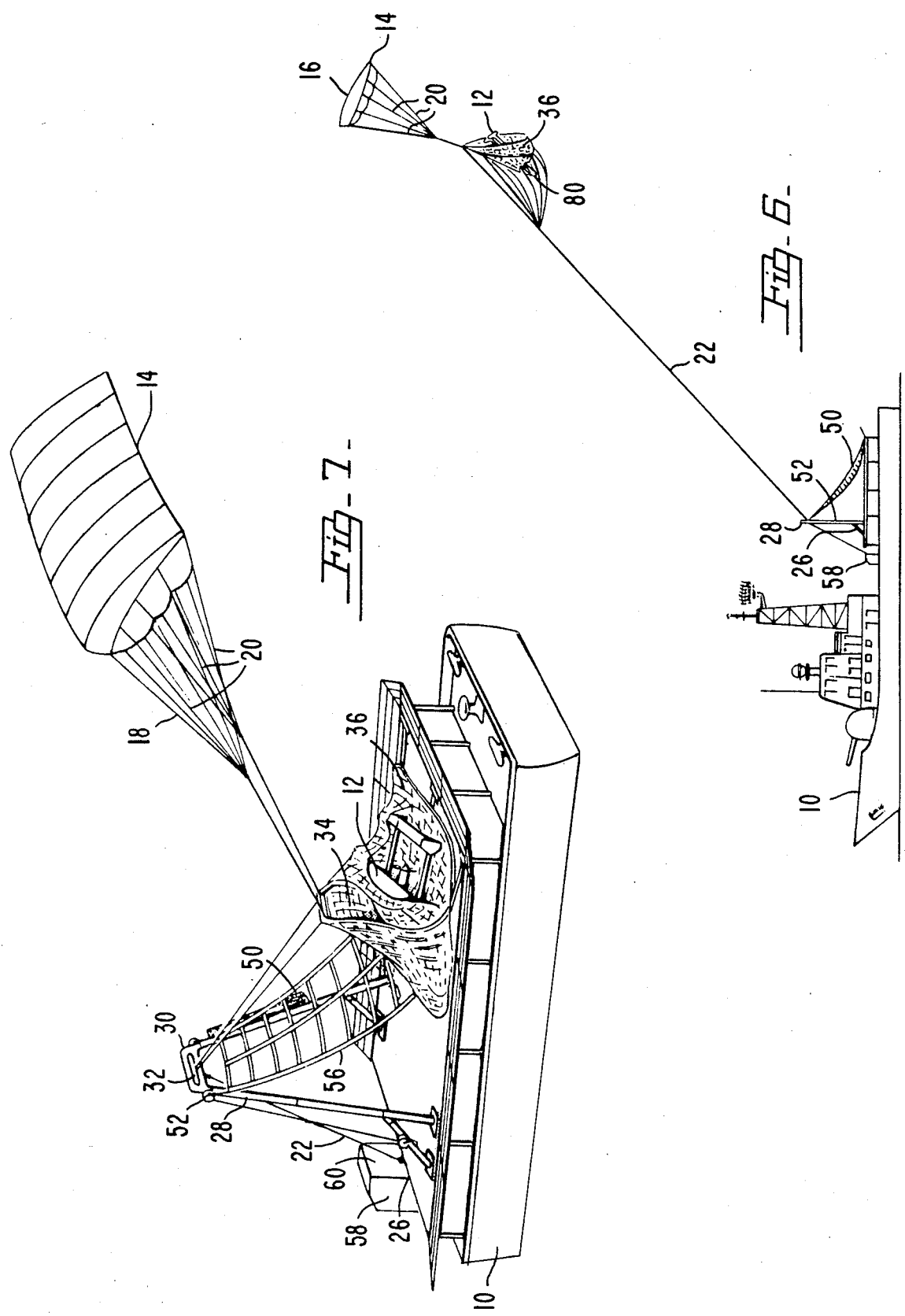

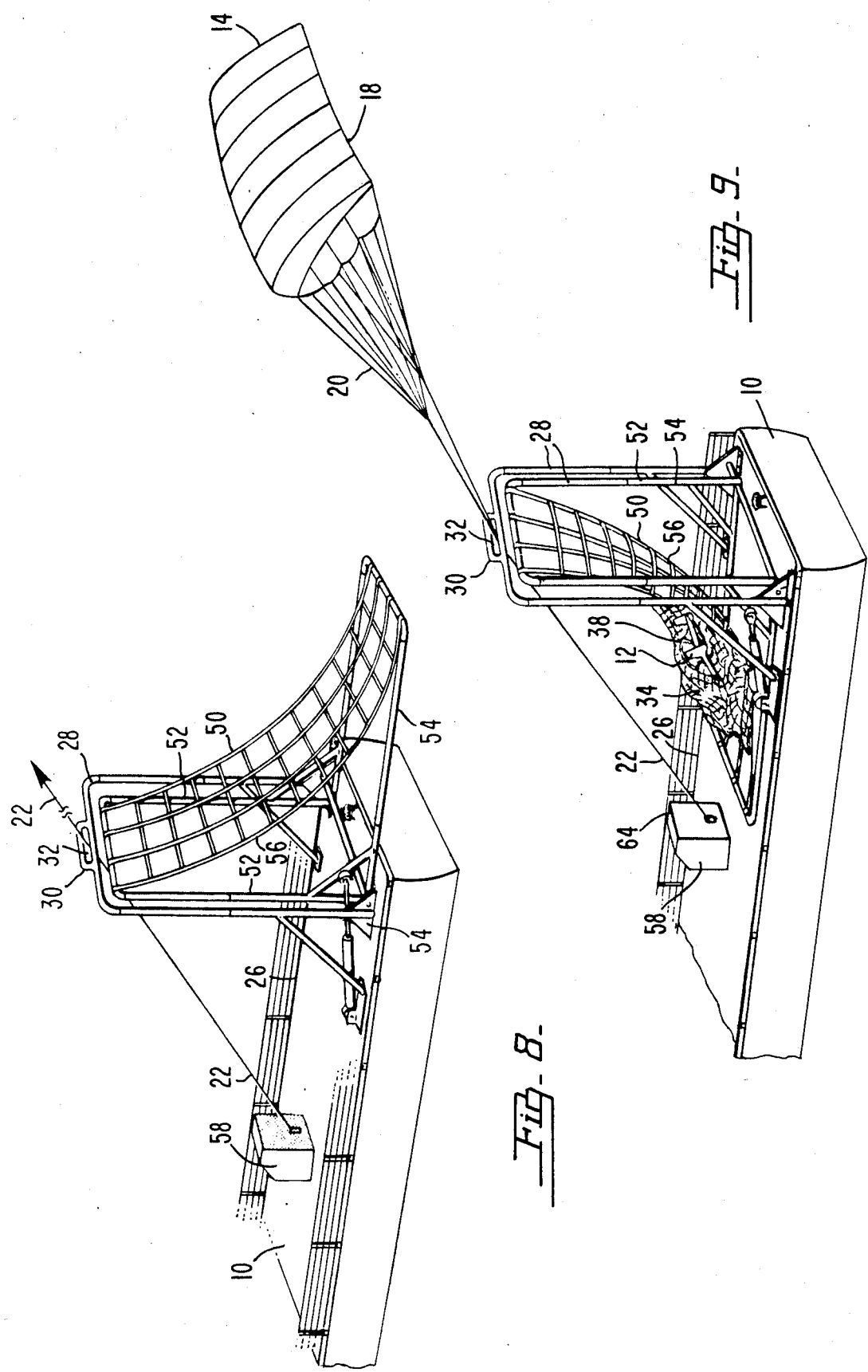

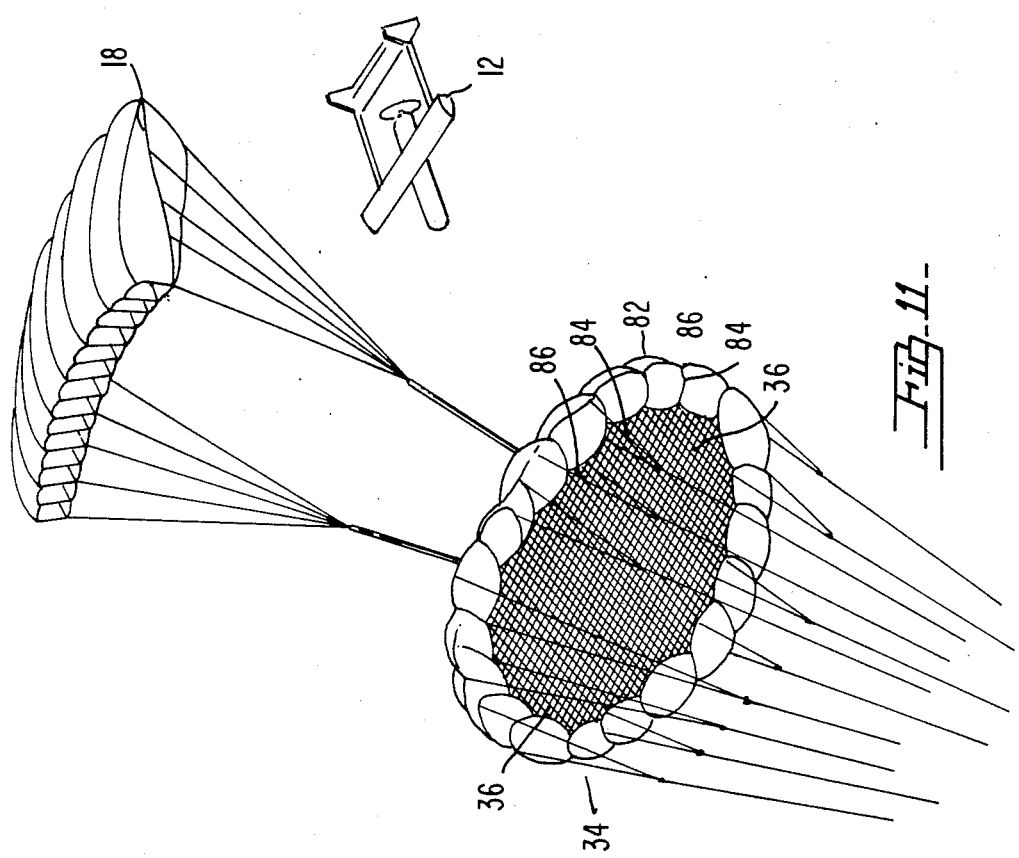
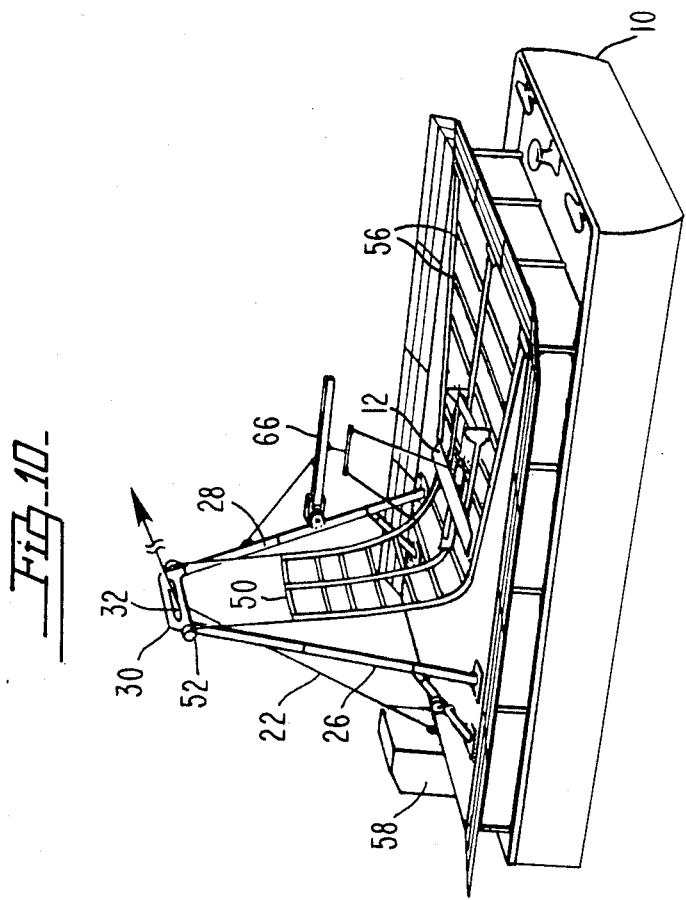

SHIPBOARD AIR VEHICLE RETRIEVAL APPARATUS

BACKGROUND OF THE INVENTION

1. Field of the Invention

The present invention deals with the field of devices which address the unique problems of launch and recovery of sea-based remotely piloted vehicle systems. Such systems preferably are reusable and must be capable of capturing the air vehicle in a safe manner to prevent danage to the vehicle itself or to the valuable payloads carried thereon without endangering the ship or its crew. Also minimum reconditioning of the capturing apparatus as well as the captured air vehicles between capturing activities is desirable.

Since landing is a very difficult maneuver to perform with an aircraft in a remote manner, the chances of damage to a pilotless air vehicle are quite great. Therefore, the present invention provides a means to automatically capture these vehicles without necessarily requiring a remotely controlled landing. This apparatus is also usable aboard a ship and preferably aboard a surface vessel of any configuration but which is indeed traveling into the wind.

2. Description of the Prior Art

Examples of prior art configurations generally usable to achieve these purposes include U.S. Pat. No. 1,128,072 for a Landing and Transfer Net for Use at Sea patented Feb. 9, 1915 to J. A. Steinmetz; U.S. Pat. No. 1,164,967 for an Aeroplane Alighting and Launching Apparatus patented Dec. 21, 1915 to J. M. Thorp; U.S. Pat. No. 1,712,164 for an Antiaircraft Screen patented May 7, 1929 to J. Peppin; U.S. Pat. No. 2,285,789 for an Airplane Trap patented June 9, 1942 to A. W. Woolley; U.S. Pat. No. 2,365,778 for a Mobile Device for Repelling the Attack of Enemy Aircraft patented Dec. 26, 1944 to M. S. Schwab; U.S. Pat. No. 2,378,563 for a Protecting Apparatus patented June 19, 1945 to A. J. Lakatos, Jr.; U.S. Pat. No. 3,389,880 for a Parachute System for Mid-Air Load Recovery patented June 25, 1968 to O. B. Ferguson; U.S. Pat. No. 3,980,250 for Aircraft Recovery Methods patented Sept. 14, 1976 to Greenhalgh et al; U.S. Pat. No. 4,147,317 for a Mobile RPV Landing Deck patented Apr. 3, 1979 to Mayhew et al; and U.S. Pat. No. 4,311,290 for an Arrestment System patented Jan. 19, 1982 to Kenneth T. Koper.

The traditional approach of recovery would be a parasitic recovery system on board the air vehicle. However, this would be detrimental to the payload carrying ability of the vehicle and would decrease the speed, range and endurance thereof. The activities of the air vehicle itself would thereby be compromised and made significantly more expensive. An alternative approach would be descent directly into the sea but this would endanger the lives of the recovery crews as well as introducing the possibility of damaging the equipment, the air vehicle or the retrieval vessel. Also such activities are known to be particularly difficult at night or during inclement weather or under time pressure situations.

SUMMARY OF THE INVENTION

The present invention provides an apparatus for retrieving of air vehicles and particularly pilotless air vehicles. This apparatus can be mounted upon virtually any type of surface vessel which at least includes a relatively small amount of open area in a rear or upper deck area thereof.

The apparatus includes a deployable lifting means which may take the form of a parachute such as a ram-air parachute. The ram-air parachute provides the main support for the capturing net as the ship travels into the wind.

The ram-air parachute is secured to the upper end of a tow line which itself is attached with respect to the ship therebelow. A stanchion means having a frame and a guide means therein is secured to the ship and is adapted to guide the tow line means such that it is maintained rearwardly and upwardly from the direction of travel of the ship. The bottom end of the tow line means is preferably secured with respect to a winch-like device to control the length of the tow line itself.

The capturing means comprises preferably a capturing net such as an annual ribbon parachute made of an open mesh of polyester webbing. This capturing net is secured to the tow line immediately below the ram-air parachute lifting means. Thus the ram-air parachute supplies the lift which holds the capturing ribbon parachute in the inflated orientation and elevated aftward above the ship therebelow. It may be preferable to provide an initial launching impedance to the upper end of the tow line, the ram-air parachute, and the ribbon parachute and this can be provided in at least two manners. Firstly it is possible to utilize an additional parachute means such as a first parachute which when inflated will lift the non-inflated ram-air parachute and capturing parachute upwardly to a desired level. Once this desired elevation is achieved, the initial lifting parachute can be cut loose by for example a time delay cutting apparatus and thereby allowing deployment of the ram-air parachute followed by the capturing net.

This can also be provided by a more conventional catapulting means such as an explosive mortar device which can shoot the ram-air parachute and capturing net upwardly while in a deflated state and then allow inflation thereof when altitude is reached.

A landing net can be secured with respect to the ship adjacent to the tow line to receive the air vehicle after capture. Also the winch adjacent to this landing net is preferably reversible to facilitate the selective increase in and decreasing of the extended length of the tow line. It is also preferable that the normally-automatic winch be capable of manual overriding control. A danger sensing means should also be included within the winch structure in order to determine dangerous system consitions such as excessive pull on the tow line in order to control the winch movement. For an example when excessive pull is desired, the tow line can be extended and when the pull on the tow line is too low (such that lifting action is in danger) the tow line can be retracted to some extent. It is also possible that under extremely dangerous conditions a first cutting means can be included to selectively cut the tow line means responsive to certain highly dangerous pre-determined conditions being sensed by the danger sensing means. This cutting means may be pyrotechnic.

A crane and hoist device can also be included to facilitate removal of a recovered vehicle from the landing net to allow for speedy re-use of the air vehicle capturing apparatus of the present invention. This capturing is further facilitated by the usage of a landing net frame which is pivotal to be facing rearwardly for receiving of the captured vehicle and then with the capability of being pivoted forwardly 90 degrees to facilitate removal of the vehicle onto the ship itself.

Preferably the landing net means will be of an open mesh of nylon webbing to facilitate holding of the captured vehicle and will also be supported on a landing net frame such as to be spaced vertically upwardly from the surface of the ship to minimize damage of the captured air vehicle while located therein or thereon.

The ribbon capturing net itself may present an elliptical capturing configuration made possible by a plurality of lateral retaining lines extending thereacross in a lateral direction in order to minimize the lateral expansion of this ribbon parachute along one direction. Alternatively the capturing means can be annular.

The tow line itself has been found to be capable of being made of steel, nylon, polypropolene, kevlar, or a nylon/polypropolene hybrid. Testing has found that the length of the two line means should preferably be at least 200 feet.

With systems utilizing the initial launching means preferably a primary retaining means will be adapted to hold the ram-air parachute in a non-fully inflated condition. Similarly a secondary retaining means will be adapted to hold the ribbon capturing parachute in a non-inflated condition until released. With these configurations those two portions of the present apparatus can be partially or wholly released at a time delay or at an altitude as desired.

To facilitate guiding of a remotely piloted vehicle into the ribbon capturing net of the present invention a homing means such as a radio homing beacon may be positioned in the capturing net. This will provide a targeting mechanism for the air vehicle and facilitate accurate capturing thereof. The capturing means itself is also preferably of an open mesh of nylon webbing to facilitate retaining of the air vehicle therein.

Alternatively, a TV camera aimed downstream with a field of view capable of encompassing the approaching air vehicle, may be mounted in or on the capture means or lifting means to provide an approach control operator with a means for visually monitoring and controlling the approach and engagement. Furthermore, the TV camera can indeed be aboard the approaching air vehicle, in which case the capture means may be equipped with provisions for enhancing visual acquisition, retention and guidance cues to the remote operator.

It is an object of the present invention to provide an air vehicle retrieval apparatus for use aboard a ship which is as simple and affordable and practical as possible.

It is an object of the present invention to provide an air vehicle retrieval apparatus for use aboard a ship which is capable of safe retrieval of valuable payloads.

It is an object of the present invention to provide an air vehicle retrieval apparatus for use aboard a ship which minimizes reconditioning of retrieval apparatus or air vehicles required between flights.

It is an object of the present invention to provide an air vehicle retrieval apparatus for use aboard a ship which is usable on a great variety of different types of ships.

It is an object of the present invention to provide an air vehicle retrieval apparatus for use aboard a ship which does not require the need for specific skills or labor specialties otherwise not normally found aboard ships.

It is an object of the present invention to provide an air vehicle retrieval apparatus for use aboard a ship which does not require the placement of additional or non-standard equipment aboard the air vehicles themselves.

It is an object of the present invention to provide an air vehicle retrieval apparatus for use aboard a ship which does not require the recovery crews to enter into the sea at any time.

It is an object of the present invention to provide an air vehicle retrieval apparatus for use aboard a ship which includes manual overrides to many functions as may be employed at the discretion of the ship personnel.

It is an object of the present invention to provide an air vehicle retrieval apparatus for use aboard a ship which achieves full capturing utilizing only a single ship traveling into the wind and without requiring the usage of any additional companion aircraft.

It is an object of the present invention to provide an air vehicle retrieval apparatus for use aboard a ship which minimizes the probability of a collision of a remotely piloted vehicle with respect to the capturing ship during an aborted or missed recovery.

It is an object of the present invention to provide an air vehicle retrieval apparatus for use aboard a ship which provides the ability for the remotely piloted vehicle to survive a missed recovery attempt.

It is an object of the present invention to provide an air vehicle retrieval apparatus for use aboard a ship which includes the ability to deploy the system and recover aircraft and secure the system underway with minimal interference with other ship operations and to minimize the number of personnel distracted from other assignments to support recovery operations.

It is an object of the present invention to provide an air vehicle retrieval apparatus for use aboard a ship which minimizes space requirements for stowage or operations aboard ship.

It is an object of the present invention to provide an air vehicle retrieval apparatus for use aboard a ship which has a very low operational cost per recovery.

It is an object of the present invention to provide an air vehicle retrieval apparatus for use aboard ship around-the-clock, in light or darkness, and in any climate or weather.

It is an object of the present invention to provide retrieval apparatus for use aboard ship to recover all reuseable assets such as missiles, aircraft, targets, decoys, remotely piloted vehicles, returning space vehicles or payloads, or space transportation system elements.

It is an object of the present invention to provide a retrieval apparatus for use aboard any (i.e. land-based or water-based) surface vessel, amphibious vessel or submersible vessel, as a means for recovering:

1. developmental flight test vehicles free from added landing damage;
2. production acceptance test vehicles;
3. vehicles employed in crew training and measurement of continuing operational readiness and proficiency; or
4. vehicles whose economic viability depend on continuing, repeated refurbishment and reuse.

It is an object of the present invention to provide an apparatus for air vehicle retrieval which is compact, man-portable, mobile and stowable aboard a host vessel.

It is an object of the present invention to provide an apparatus for air vehicle retrieval where the motions of the towed apparatus is heavily damped thereby automatically compensating for the near-zone air turbulence created by the movement of the super structure of the towing vessel through the air ahead of the flight or approach path of the air vehicle.

It is an object of the present invention to provide an apparatus for air vehicle retrieval where the shape and materials of the air vehicle recovery apparatus provide a low radar profile as well as a low visual profile.

It is an object of the present invention to provide an apparatus for air vehicle retrieval where the approach guidance and control subsystem to command the air vehicle approach is capable of operation in the absence of a remote human operator.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a perspective view of an embodiment of the air vehicle apparatus of the present invention showing the initial launching of one alternative of the first launching means;

FIG. 2 is a side plan view of an embodiment of the present invention immediately after release of the initial launching means and after deployment of the deployable lifting ram-air parachute;

FIG. 3 is a perspective illustration of an embodiment of the present invention showing the apparatus fully deployed with an air vehicle about to be captured;

FIG. 4 is an illustration of the present invention immediately prior to initial launch utilizing an explosive mortar launching means;

FIG. 5 is a perspective view of the ram-air parachute and ribbon capturing parachute in the fully deployed position;

FIG. 6 is a side profile view of the apparatus shown in FIG. 3 immediately after capture of the air vehicle;

FIG. 7 is a perspective view of an embodiment of the apparatus of the present invention showing the ribbon capturing parachute and the captured air vehicle positioned in the landing net;

FIG. 8 is an illustration of the pivotable landing net means of the present invention in the air vehicle receiving position;

FIG. 9 is an illustration of the embodiment shown in FIG. 8 with the pivotable landing means rotated to the air vehicle removal position;

FIG. 10 is an illustration of an embodiment of the present invention showing the crane and hoist device in use removing an air vehicle from the landing net; and FIG. 11 is an illustration of an alternative configuration of the capturing net of an embodiment of the air vehicle retrieval apparatus of the present invention.

DETAILED DESCRIPTION OF THE PREFERRED EMBODIMENT

The present invention provides an air vehicle retrieval apparatus which is mountable aboard a ship 10. A pilotless air vehicle 12 is adapted to be captured safely and placed on board ship 10. To make this capture a deployable lifting means 14 is included preferably as a parachute means 16 of a ram-air configuration 18.

Ram-air parachute 18 is secured to the upper end of a tow line means 22 which is of a particular tow line length 24 of preferably at least 200 feet. The lower end of the tow line is secured with respect to the ship 10 and with the ship traveling in the up wind direction the ram-air parachute 18 will lift and trail the movement of ship 10. Tow line means 22 is preferably controlled by a winch means 58. Winch 58 is preferably reversible in such a manner as to be capable of letting out or pulling in the length 24 of the tow line 22. The winch means may be automatic and electrical but preferably will have a manual override control for emergency situations. Tow line 22 preferably will extend from the winch means 58 upwardly through a guide means 30 in the form of a guiding aperture 32. Guide means 30 will be maintained in spaced relation with respect to the deck of ship 10 by way of a stanchion means 26 which may take the form of a frame 28. This frame 28 will preferably define the guiding aperture 32 above the winch 58 and toward the rear of ship 10 to provide a means for guiding of the tow line 22 as the ship travels into the wind.

A capturing means 34 will preferably be included in the form of a capturing net 36 of an opened mesh configuration preferably made of nylon webbing. This capturing net can take the form of a ribbon parachute which is adapted to receive a pilotless air vehicle 12 therein for capture thereof. The ribbon parachute 38 will preferably present an elliptically-shaped profile 42 in cross section thereof to facilitate capture of air vehicle 12. This elliptically-shaped profile 42 is achieved by lateral retaining lines 40 shown best in FIG. 5 extending laterally across the opening of ribbon parachute 38. In the fully inflated orientation shown in FIG. 3 the ram-air parachute 18 will be above and trailing the direction of movement of ship 10 and the capturing ribbon parachute 38 will be immediately below the ram-air parachute and also attached to tow line 22. Air vehicle 12 will be capable of contacting ribbon parachute 38 for deflation thereof and capture of the air vehicle.

It may be desirable to provide an initial launching impetus vertically upwardly to facilitate initial elevation of the capturing means 34. This launching means 44 can take the form of a parachute means 46 as shown best in FIG. 1. Alternatively launching means 44 can take the form of an explosive mortar means 48 as shown in FIG. 4. In either case the ram-air parachute 18 and the capturing parachute 38 will be maintained in a non-inflated condition until the initial launching is completed. To hold the ram-air parachute 18 in the non-inflated position a primary retaining means 68 may be included. This is best shown in FIG. 1 as an encapsulating container. In a similar manner a secondary retaining means 74 may comprise an encapsulating container surrounding the capture net or ribbon parachute 38. The secondary retaining means 74 is shown best in FIG. 2 wherein the primary retaining means 68 has already been removed to allow inflation of the ram-air parachute means 18. However the secondary retaining means 74 is still retaining the ribbon parachute 38 and preventing inflation thereof. Normally the secondary retaining means 74 can be contained within the primary retaining means 68 to be released in a retained orientation upon release of the primary retaining means 68. As can be seen best in FIG. 2 once the primary retaining means 68 is released such as by a primary releasing means 70 the remains of the primary retaining means 68 as well as the parachute means 46 will be ejected. The primary releasing means 70 preferably is of a pyrotechnic construction in such a manner as to allow for a time delay of release of the primary releasing means 70 after initial launching. This is made possible through a primary time delay means 72 included within the primary pyrotechnic releasing means 70.

A secondary releasing means 76 is associated with the secondary retaining means 74 in order to release and inflate the capture net 36 as desired. Similarly a secondary time delay means 78 which may be pyrotechnic is included in the secondary releasing means 76 to control timing of the inflation of the capturing parachute 38.

In the preferred configuration initially the parachute launching means 46 carries the primary retaining means 68 above and rearwardly from the ship traveling up wind. The parachute launching means 46 will continue to carry the primary retaining means 68 upwardly in the retained condition until initiation of the primary pyrotechnic releasing means 70. In the preferred embodiment the primary time delay means 72 is set to release the primary retaining means 68 at approximately 120 seconds after initial launching of parachute 46. Thus 120 seconds after launching primary releasing means 70 will be initiated to eject primary retaining means 68 as well as launching parachute means 46.

At the point of release of the primary retaining means 68 the secondary pyrotechnic time delay means 78 will be initiated for a 20 second delay. Thus 20 seconds later the secondary releasing means 76 will be actuated causing ejection of secondary retaining means 74 with consequential inflation of the capturing ribbon parachute 38. Thus the sequence of events from the initial launching to the fully operable air vehicle capturing mode is 120 plus 20 seconds or approximately 140 seconds.

In order to prevent elongation of the support line of ram-air parachute 18 the lines themselves are preferably of a kevlar material 20. This maintains the overall integrity of the ram-air parachute 18 under sometimes significant amounts of longitudinal force.

A landing net means 50 is preferably secured with respect to the deck of the ship in a spaced relation with respect thereto. This spaced relation is made possible by a landing net frame 52 which holds the landing net somewhat elevated from the deck surface. Preferably the landing net 50 is of an open mesh nylon webbing. In an alternative configuration shown best in FIGS. 8 and 9 the landing net frame 52 may be pivotable as shown by frame 54. This pivoting can be through a 90 degree pivot from a rearwardly facing landing net configuration to a forwardly facing landing net configuration to facilitate removal of the capturing net and the air vehicle 12 therefrom.

Under certain operating conditions it will be necessary to cut loose the entire air-borne portion of the apparatus of the present invention. As such the winch means 58 will preferably include danger sensing 60 which is operable through emergency winch controls 62 to control winch operation. These emergency winch controls 62 could be operable to decrease or increase the length 24 of tow line 22 or could be operable to initiate a first cable cutting means 64 which may be pyrotechnic in order to sever the tow line 22 under severely dangerous conditions.

A crane and hoist device 66 may be included to lift the air vehicle 12 out of the landing net 50 in such a manner as to allow for quick and speedy re-use of the apparatus of the present invention. Also a homing means such as radio homing beacon 80 or alternatively, a TV camera) could be positioned in the ribbon capturing parachute to provide a target toward which a remotely piloted air vehicle can be remotely directed.

The control winch 58 can be an electrically-powered drum-type reversible winch but responds to manual as well as feedback control information. The feedback controls can be designed to prevent system overloads and in particular to cancel out any out of phase payload to deck relative cyclical motion.

It is preferable in the present invention that the stanchion means 26 and in particular the frame 28 thereof serve as a means for guiding the movement of tow line 22 to center the payload over the landing net as well as providing the height necessary to position the captured air vehicle 12 immediately over landing net 50. This is achieved by a significant amount of spacing existing between guiding aperture 32 and the upper surface of the deck of ship 10.

FIG. 11 illustrates an alternative configuration for the capture net 36 of the capturing means 34 of the present invention. Rather than utilizing an elliptically-shaped ribbon parachute 38, the present invention may include an annular means 82 which is adapted to suspend the capturing net 36 across the interior opening thereof. The suspension lines 20 will extend upwardly to a position somewhat near the annular means. A plurality of first line sections 84 will be attached to the outer portion of the annular means 82 and a plurality of second sections 86 will be attached to the inner portions of the annular means 82. The first sections 84 and the second sections 86 will extend downwardly and be secured with respect to one another and attached to the downwardly extending support lines 20. Other portions of the apparatus for shipboard air vehicle retrieval will be as described above.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. An air vehicle retrieval apparatus for use aboard a ship comprising:
   (a) a deployable lifting means to travel vertically upwardly above the ship therebelow;
   (b) a tow line means attached with respect to the ship therebelow and attached to said deployable lifting means traveling thereabove;
   (c) a stanchion means secured with respect to the ship and further including a guide means thereon adapted to receive said tow line means extended therethrough for guiding positioning thereof; and
   (d) a capturing means secured to said tow line means above said stanchion means and below said deployable lifting means to be adapted to be carried airborn, said capturing means being further adapted to receive an air vehicle therein for safe capture and retrieval thereof.

2. The apparatus as defined in claim 1 further comprising a launching means to provide initial lifting impetus to the airborn parts of the apparatus.

3. The apparatus as defined in claim 2 wherein said launching means comprises a first parachute means secured above said deployable lifting means and above said capturing means.

4. The apparatus as defined in claim 2 wherein said launching means comprises an explosive mortar means.

5. The apparatus as defined in claim 1 further comprising a landing net means secured with respect to the ship adjacent said tow line means to receive an air vehicle therein after capture within said capturing means.

6. The apparatus as defined in claim 1 further comprising a winch means secured with respect to the ship and having the lower end of said tow line means attached thereto to facilitate changing of the extended length of said tow line means extended between said stanchion means and said deployable lifting means.

7. The apparatus as defined in claim 1 wherein said deployable lifting means comprises a second parachute means.

8. The apparatus as defined in claim 1 wherein said deployable lifting means comprises a ram-air parachute means.

9. The apparatus as defined in claim 1 wherein said stanchion means comprises a frame means defining a guiding aperture therein adapted to receive said tow line means extended therethrough to facilitate guiding thereof.

10. The apparatus as defined in claim 6 wherein said winch means is reversible to facilitate selective increasing and decreasing of the extended length of said tow line means.

11. The apparatus as defined in claim 6 wherein said winch means is manually controlled.

12. The apparatus as defined in claim 6 wherein said winch means includes danger sensing means for determining dangerous system conditions and further including emergency winch controls to control winch movement to prevent damaging of the air vehicle retrieval apparatus and captured air vehicle.

13. The apparatus as defined in claim 12 wherein said emergency winch controls further include first cable cutting means to selectively cut said tow line means responsive to certain predetermined conditions being sensed by said sensing means.

14. The apparatus as defined in claim 13 wherein said first cable cutting means is pyrotechnic.

15. The apparatus as defined in claim 6 wherein said winch means is detachably secured with respect to said ship to be portable with respect thereto.

16. The apparatus as defined in claim 1 wherein said stanchion means is positioned extending vertically upwardly from the ship to locate said guide means and said tow line means in vertically spaced relation with respect to the ship to facilitate safe capture and retrieval of an air vehicle.

17. The apparatus as defined in claim 5 further including a crane and hoist device for facilitating removal of a recovered air vehicle from said landing net means.

18. The apparatus as defined in claim 5 wherein said landing net means is secured with respect to said stanchion means for spacing thereof away from the ship to minimize damaging of an air vehicle during capture and retrieval thereof.

19. The apparatus as defined in claim 5 wherein said landing net means is an open mesh of nylon webbing.

20. The apparatus as defined in claim 8 wherein said ram-air parachute means includes a plurality of support lines woven from kevlar filaments to prevent elongation thereof under tension.

21. The apparatus as defined in claim 1 wherein said capturing means includes an annular member defining an opening centrally located therein, said capturing means further including a capture net extending across said opening in said annular member for receiving and retaining an air vehicle captured therein.

22. The apparatus as defined in claim 21 wherein said capturing means comprises a ribbon parachute.

23. The apparatus as defined in claim 21 wherein said capturing net includes a plurality of lateral retaining lines positioned extending thereacross to present an elliptically-shaped capturing profile.

24. The apparatus as defined in claim 1 wherein said tow line means is of steel.

25. The apparatus as defined in claim 1 wherein said tow line means is of nylon.

26. The apparatus as defined in claim 1 wherein said tow line means is of polypropolene.

27. The apparatus as defined in claim 1 wherein said tow line means is of kevlar.

28. The apparatus as defined in claim 1 wherein said tow line means is of a nylon/polypropolene hybrid.

29. The apparatus as defined in claim 1 wherein said tow line means is at least 200 feet in length.

30. The apparatus as defined in claim 2 further comprising a primary retaining means adapted to hold said deployable lifting means in non-inflated condition until released.

31. The apparatus as defined in claim 30 further including a primary releasing means adapted to open said primary retaining means to allow release of said deployable lifting means for inflation thereof.

32. The apparatus as defined in claim 31 wherein said primary releasing means comprises a primary pyrotechnic cutting means.

33. The apparatus as defined in claim 32 wherein said primary pyrotechnic cutting means includes primary time-delay means to open said primary retaining means at a predetermined time after initial launch of the air vehicle retrieval apparatus.

34. The apparatus as defined in claim 2 further comprising a secondary retaining means adapted to hold said capturing means in non-inflated condition until released.

35. The apparatus as defined in claim 34 further including a secondary releasing means adapted to open said secondary retaining means to allow release of said capturing means for inflation thereof.

36. The apparatus as defined in claim 35 wherein said secondary releasing means comprises a secondary pyrotechnic cutting means.

37. The apparatus as defined in claim 36 wherein said secondary pyrotechnic cutting means includes secondary time delay means.

38. The apparatus as defined in claim 1 further comprising a homing means located in said capturing means to facilitate targeting of an air vehicle therein.

39. The apparatus as defined in claim 38 wherein said homing means is a radio homing beacon.

40. The apparatus as defined in claim 38 wherein said homing means is remotely initiated.

41. The apparatus as defined in claim 1 wherein said capturing means is an open mesh of nylon webbing.

42. The apparatus as defined in claim 5 further including a landing net frame being pivotally secured with respect to the ship and being adapted to receive said landing net means secured thereto, said landing net frame being pivotally movable from an air vehicle receiving position to an air vehicle removal position and vice versa.

43. The apparatus as defined in claim 42 wherein said landing net frame is pivotally movable through approximately 90 degrees.

44. The apparatus as defined in claim 1 wherein said ship is oriented moving into the prevailing wind of the environment of the recovery area.

45. An air vehicle retrieval apparatus for use aboard a ship moving into the prevailing wind of the environment of the recovery area which comprises:

(a) a deployable lifting means to travel vertically upwardly above the ship therebelow, said deployable lifting means comprising a ram-air parachute means;

(b) a tow line means attached with respect to the ship therebelow and attached to said deployable lifting means traveling thereabove;

(c) a stanchion means secured with respect to the ship, said stanchion means including a frame means defining a guide means thereon adapted to receive said tow line means extended therethrough to facilitate guiding positioning thereof, said stanchion means being positioned extending vertically upwardly from the ship to locate said guide means and said tow line means in vertically spaced relation with respect to the ship to facilitate safe capture and retrieval of an air vehicle;

(d) a capturing means comprising a ribbon parachute of open nylon webbing secured to said tow line means above said stanchion means and below said deployable lifting means to be adapted to be carried airborn, said capturing means being further adapted to receive an air vehicle therein for safe capture and retrieval thereof, said ribbon parachute including a plurality of lateral retaining lines positioned extending thereacross to present an elliptically-shaped capturing profile;

(e) a launching parachute means secured with respect to the upper end of said tow line means to provide initial lifting impetus to the air vehicle retrieval apparatus;

(f) a landing net means of open nylon webbing secured at one end with respect to the ship and at the other end secured with respect to said frame means of said stanchion means to maintain said landing net means in spaced relation with respect to the ship to minimize damaging thereof during air vehicle retrieval, said landing net means being adjacent said two line means to receive an air vehicle therein after capture within said capturing means;

(g) a winch means secured with respect to the ship and having the lower end of said tow line means attached thereto to facilitate changing of the extended length of said tow line means between said stanchion means and said deployable lifting means, said winch means being reversible and being capable of manual overriding to facilitate control of the extended length of said tow line, said winch means including danger sensing means and emergency winch controls operably connected to said danger sensing means and being responsive to actuation thereof to control winch operation to prevent damaging of the air vehicle retrieval apparatus and the captured air vehicle;

(h) a crane and hoist means mounted with respect to the ship adjacent said landing net means to facilitate removal of a recovered air vehicle from said landing net;

(i) a primary retaining means adapted to hold said deployable lifting means in non-inflated condition until released, said primary retaining means including a primary releasing means adapted to open said primary retaining means to selectively allow release and inflation of said deployable lifting means at a predetermined time;

(j) a secondary retaining means adapted to hold said ribbon parachute in non-inflated condition until released, said secondary retaining means including a secondary releasing means adapted to open said secondary retaining means to selectively allow release and inflation of said ribbon parachute at a predetermined time; and (k) homing beacon means located in said ribbon parachute to serve as a targeting spot for an air vehicle being recovered, said homing beacon means being remotely initiatable.

46. The apparatus as defined in claim 45 wherein said emergency winch controls further include first cable cutting means to selectively cut said tow line means responsive to certain predetermined dangerous conditions being sensed by said sensing means.

47. The apparatus as defined in claim 46 wherein said first cable cutting means is pyrotechnic.

48. The apparatus as defined in claim 45 wherein said winch means is detachably secured with respect to said ship to be portable with respect thereto.

49. The apparatus as defined in claim 45 wherein said ram-air parachute means includes a plurality of support lines woven from kevlar filaments to prevent elongation thereof under tension.

50. The apparatus as defined in claim 45 wherein said tow line means is at least 200 feet in length.

51. The apparatus as defined in claim 45 wherein said primary releasing means comprises a primary pyrotechnic cutting means.

52. The apparatus as defined in claim 45 wherein said secondary releasing means comprises a secondary pyrotechnic cutting means.

53. The apparatus as defined in claim 45 wherein said primary releasing means is adapted to open said primary retaining means to selectively allow release and inflation of said deployable lifting means at approximately 120 seconds after initial release of the air vehicle retrieval apparatus.

54. The apparatus as defined in claim 45 wherein said secondary releasing means is adapted to open said secondary retaining means approximately twenty seconds after release of said primary releasing means.

55. The apparatus as defined in claim 45 further including a landing net frame being pivotally secured with respect to the ship and being adapted to receive said landing net means secured thereto, said landing net frame being pivotally movable from an air vehicle receiving position to an air vehicle removal position and vice versa.

56. The apparatus as defined in claim 45 wherein said landing net frame is pivotally movable through approximately 90 degrees.

* * * * *